(12) United States Patent
Asterjadhi et al.

(10) Patent No.: US 11,350,448 B2
(45) Date of Patent: May 31, 2022

(54) TRANSMISSION OPPORTUNITY CONTENTION FOR MULTIPLE USER OPERATION

(71) Applicant: QUALCOMM Incorporated, San Diego, CA (US)

(72) Inventors: Alfred Asterjadhi, San Diego, CA (US); George Cherian, San Diego, CA (US); Simone Merlin, San Diego, CA (US); Gwendolyn Denise Barriac, Encinitas, CA (US); Gang Ding, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 15/183,322

(22) Filed: Jun. 15, 2016

(65) Prior Publication Data
US 2016/0374112 A1   Dec. 22, 2016

Related U.S. Application Data

(60) Provisional application No. 62/180,522, filed on Jun. 16, 2015.

(51) Int. Cl.
*H04W 72/12* (2009.01)
*H04W 74/08* (2009.01)
*H04B 7/0452* (2017.01)

(52) U.S. Cl.
CPC ....... *H04W 74/08* (2013.01); *H04W 74/0816* (2013.01); *H04B 7/0452* (2013.01)

(58) Field of Classification Search
CPC . H04B 7/0452; H04W 74/08; H04W 74/0816
See application file for complete search history.

(56) References Cited

U.S. PATENT DOCUMENTS

2010/0150116 A1\* 6/2010 Ji .................. H04W 74/0875
                                                370/338
2011/0051647 A1   3/2011 Sampath et al.
(Continued)

FOREIGN PATENT DOCUMENTS

CN   103037531 A    4/2013
CN   103476130 A   12/2013
(Continued)

OTHER PUBLICATIONS

ISA/EP, International Search Report and Written Opinion of the International Searching Authority, In't Application No. PCT/US2016/037886, dated Sep. 5, 2016, European Patent Office, Rijswijk, NL, 11 pgs.

*Primary Examiner* — Asad M Nawaz
*Assistant Examiner* — Zhaohui Yang
(74) *Attorney, Agent, or Firm* — Holland & Hart LLP

(57) ABSTRACT

Methods, systems, and devices are described for wireless communication at a station. The station identifies a first set of enhanced distributed channel access (EDCA) parameters for a first access category based at least in part on a first traffic type and a determination that a multiple user (MU) frame is to be transmitted, and contends to gain access for a transmission opportunity over a shared radio frequency spectrum band to communicate with a plurality of other stations in a MU mode. The contention is based at least in part on the first set of EDCA parameters.

25 Claims, 13 Drawing Sheets

(56) References Cited

U.S. PATENT DOCUMENTS

| | | | |
|---|---|---|---|
| 2011/0090855 A1 | 4/2011 | Kim | |
| 2011/0194644 A1 | 8/2011 | Liu et al. | |
| 2011/0255618 A1* | 10/2011 | Zhu | H04B 7/0413 375/260 |
| 2011/0268094 A1* | 11/2011 | Gong | H04L 1/1685 370/338 |
| 2012/0008490 A1* | 1/2012 | Zhu | H04W 74/0841 370/216 |
| 2013/0336251 A1* | 12/2013 | Park | H04L 47/6215 370/329 |
| 2014/0064301 A1 | 3/2014 | Rison | |
| 2014/0254502 A1 | 9/2014 | Cai et al. | |
| 2015/0063327 A1* | 3/2015 | Barriac | H04W 56/0005 370/337 |
| 2015/0071051 A1 | 3/2015 | Zhu et al. | |
| 2016/0029373 A1* | 1/2016 | Seok | H04L 5/0055 370/338 |
| 2016/0113009 A1* | 4/2016 | Seok | H04B 7/0452 370/329 |
| 2016/0345362 A1* | 11/2016 | Lee | H04W 74/0816 |
| 2018/0288743 A1* | 10/2018 | Choi | H04L 5/0094 |

FOREIGN PATENT DOCUMENTS

| | | |
|---|---|---|
| JP | 2013520092 A | 5/2013 |
| JP | 2013531404 A | 8/2013 |
| WO | WO-2011025842 A1 | 3/2011 |
| WO | WO-2011132847 A1 | 10/2011 |
| WO | WO-2015031487 A1 | 3/2015 |
| WO | WO-2015066326 A1 | 5/2015 |

\* cited by examiner

TRANSMISSION OPPORTUNITY CONTENTION FOR MULTIPLE USER OPERATION

CROSS REFERENCES

The present Application for Patent claims priority to U.S. Provisional Patent Application No. 62/180,522 by Asterjadhi et al., entitled "Transmission Opportunity Contention for Multiple User Operation," filed Jun. 16, 2015, assigned to the assignee hereof.

BACKGROUND

The following relates generally to wireless communication, and more specifically to transmission opportunity contention for multiple user operation in a wireless local area network (WLAN).

A wireless network, for example a WLAN, may include an access point (AP) that communicates with one or more stations (STAs) or wireless devices. The AP may be coupled to a network, such as the Internet, and may enable a wireless device to communicate via the network (or communicate with other devices coupled to the access point in a service set, e.g., a basic service set (BSS) or extended service set (ESS)). A wireless device may communicate with a network device bi-directionally. For example, in a WLAN, a STA may communicate with an associated AP via a downlink (DL) and an uplink (UL). From the STA's perspective, the DL (or forward link) may refer to the communication link from the AP to the station, and the UL (or reverse link) may refer to the communication link from the station to the AP. In some cases, an AP may communicate with multiple STAs in parallel. For example, an AP may transmit to multiple STAs in parallel or receive from multiple STAs in parallel. IEEE Standard 802.11ac provides a framework for a DL multiple user (MU) multiple-input multiple-output (MIMO) (DL MU-MIMO) mode. Proposals for IEEE Standard 802.11ax include a DL MU-MIMO mode, a DL orthogonal frequency-division multiple access (DL OFDMA) mode, a UL MU-MIMO mode, a UL OFDMA mode.

SUMMARY

The present disclosure may relate to systems, methods, or apparatuses for multiple user operation in a WLAN. Specifically, an AP or station identifies a first set of enhanced distributed channel access (EDCA) parameters for a first access category (or a first set of access categories), where the first access category is based on a first traffic type (or a first set of traffic types) and a determination that one or more frames transmitted after contending to gain access for a transmission opportunity over a shared radio frequency spectrum band is a multiple user (MU) frame. The station then contends to gain access for the transmission opportunity over the shared radio frequency spectrum band to communicate with a set of other stations (e.g., a set of one or more other stations) during a number of frames in a MU mode. The contention is based on the first set of EDCA parameters. Upon winning contention to gain access for the transmission opportunity, the station transmits a trigger frame to the set of stations. The trigger frame is a frame that the station uses to signal, to the set of other stations, the resources that the station has allocated for uplink and/or downlink transmissions from and/or to the set of other stations during the period of time following the trigger frame. The resources may include, but are not limited to, one or more subbands of the shared radio frequency spectrum band, one or more rates, and/or other parameters that the set of other stations can use to transmit on in an UL mode, or receive on in a DL mode, during the period of time following the trigger frame. After transmitting the trigger frame, the AP communicates with the set of stations. The communication may include downlink transmissions or uplink transmissions.

A method of wireless communication at a station (e.g., an AP) is described. The method includes identifying a first set of EDCA parameters for a first access category based at least in part on a first traffic type and a determination that a MU frame is to be transmitted, and contending to gain access for a transmission opportunity over a shared radio frequency spectrum band to communicate with the plurality of other stations in a MU mode. The contention is based at least in part on the first set of EDCA parameters.

An apparatus for wireless communication is described. The apparatus includes a contention parameter selector to identify a first set of EDCA parameters for a first access category based at least in part on a first traffic type and a determination that a MU frame is to be transmitted, and a medium access contender to contend to gain access for a transmission opportunity over a shared radio frequency spectrum band to communicate with the plurality of stations in a MU mode. The contention is based at least in part on the first set of EDCA parameters.

A further apparatus for wireless communication is described. The apparatus includes means for identifying a first set of EDCA parameters for a first access category based at least in part on a first traffic type and a determination that a MU frame is to be transmitted, and means for contending to gain access for a transmission opportunity over a shared radio frequency spectrum band to communicate with the plurality of stations in a MU mode. The contention is based at least in part on the first set of EDCA parameters.

A non-transitory computer-readable medium storing code for wireless communication is described. The code includes instructions executable to identify a first set of EDCA parameters for a first access category based at least in part on a first traffic type and a determination that a MU frame is to be transmitted, and instructions executable to contend to gain access for a transmission opportunity over a shared radio frequency spectrum band to communicate with the plurality of stations in a MU mode. The contention is based at least in part on the first set of EDCA parameters.

Some examples of the method, apparatuses, or non-transitory computer-readable medium described herein may further include processes, features, means, or instructions for transmitting a trigger frame to the plurality of stations upon winning contention to gain access for the transmission opportunity. The trigger frame may include an indication of the first traffic type.

Some examples of the method, apparatuses, or non-transitory computer-readable medium described herein may further include processes, features, means, or instructions for communicating with the plurality of stations in the MU frame during the transmission opportunity upon winning contention to gain access for the transmission opportunity. Additionally or alternatively, in some examples the first set of EDCA parameters provides an access priority to the shared radio frequency spectrum band, where the access priority is selected from a group consisting of a same access priority as a second set of EDCA parameters for a second access category based at least in part on the first traffic type and a determination that the frame is a single user (SU)

frame, a higher access priority than the second set of EDCA parameters, and a lower access priority than the second set of EDCA parameters.

Some examples of the method, apparatuses, or non-transitory computer-readable medium described herein may further include processes, features, means, or instructions for inputting an identifier of the MU frame to an MU queue, and identifying the first set of EDCA parameters as a set of EDCA parameters associated with the MU queue. The MU queue may be mapped to MU frames associated with multiple traffic types.

In some examples of the method, apparatuses, or non-transitory computer-readable medium described herein, the first set of EDCA parameters is a linear function of a parameter selected from a group consisting of the first access category, and a number of the plurality of stations. Additionally or alternatively, some examples may include processes, features, means, or instructions for communicating with a neighboring AP to negotiate the first set of EDCA parameters.

In some examples of the method, apparatuses, or non-transitory computer-readable medium described herein, the MU mode is selected from a group consisting of a DL OFDMA mode, a UL OFDMA mode, a DL MU-MIMO mode, and a UL MU-MIMO mode. Additionally or alternatively, the plurality of stations may be selected from a group consisting of a plurality of receiving stations, and a plurality of transmitting stations.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The described features generally relate to improved systems, methods, and/or apparatuses for multiple user operation in a WLAN. As previously indicated, proposals for IEEE Standard 802.11ax include a DL MU-MIMO mode, a DL orthogonal frequency-division multiple access (DL OFDMA) mode, a UL MU-MIMO mode, a UL OFDMA mode, and/or other MU multiplexing modes (e.g., a peer-to-peer (P2P) multiplexing mode such as a direct link set-up (DLS) mode or a tunneled DLS (TDLS) mode, in which no station serves as an AP). These MU modes enable a transmission opportunity (e.g., a period of time during which one or more frames are exchanged) to be shared across multiple users and traffic types, in a transmit (Tx) mode (e.g., on a DL) or in a receive (Rx) mode (e.g., on a UL). Described herein are techniques that prioritize access of a device to gain access to a shared radio frequency spectrum band for one or more transmission opportunities that may be used by the device and its intended receivers to exchange MU frames or single user (SU) frames, and to transmit or receive one of a number of traffic types (e.g., voice, video, best efforts, or background traffic). The techniques prioritize communication via MU frames in various ways, and in some cases give communication via an MU frame a higher access priority, a lower access priority, or the same access priority as an SU frame associated with the same traffic type.

Also described are techniques for specifying what traffic type(s) a device may transmit during a transmission opportunity that allows a MU frame to be transmitted. Throughout this application a SU TXOP refers to a transmission opportunity during which the transmitter can transmit frames in a SU mode with one or more intended receivers, where the frames for different receivers are sent at different instants of time using the same shared radio frequency spectrum band (i.e., a same channel). MU TXOP refers to a transmission opportunity during which the transmitter can transmit at least one frame in a MU mode with the one or more intended receivers, where the at least one frame that is transmitted in a MU mode is sent/received at the same instant of time but using a subset of subchannels of the shared radio frequency spectrum band for each of the frames transmitted in a MU mode.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
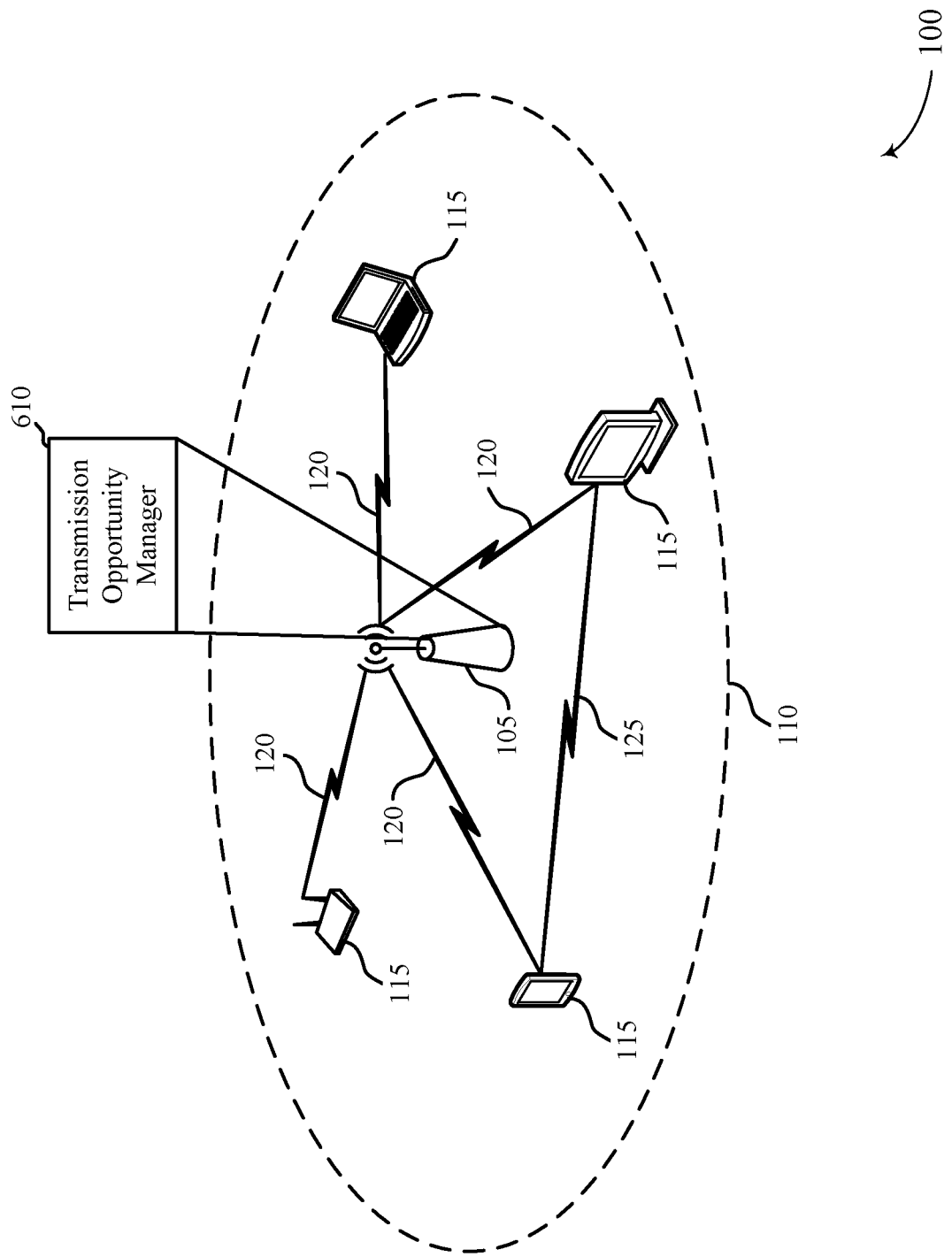
FIG. 1 shows a block diagram of a WLAN, in accordance with various aspects of the present disclosure.

Referring first to FIG. 1, a block diagram illustrates an example of a WLAN 100 (e.g., a network implementing at least one of the IEEE 802.11 family of standards), in accordance with various aspects of the present disclosure. The WLAN 100 includes an access point (AP) 105 and a number of wireless devices or stations (STAs) 115, such as mobile stations, personal digital assistants (PDAs), other handheld devices, netbooks, notebook computers, tablet computers, laptops, display devices (e.g., TVs, computer monitors, etc.), printers, etc. While one AP 105 is illustrated, the WLAN 100 may include multiple APs 105. Each of the STAs 115, which may include, e.g., mobile stations (MSs), mobile devices, access terminals (ATs), user equipments (UEs), subscriber stations (SSs), or subscriber units, may associate and communicate with the AP 105 via a respective communication link 120. The AP 105 may have a geographic coverage area 110, such that STAs 115 within the geographic coverage area 110 can typically communicate with the AP 105. The STAs 115 may be dispersed throughout the geographic coverage area 110. Each STA 115 may be stationary or mobile.

Although not shown in FIG. 1, a STA 115 can be covered by more than one AP 105 and can therefore associate with one or more APs 105 at different times. A single AP 105 and an associated set of STAs may be referred to as a BSS. An ESS may include a set of connected BSSs. A distribution system (DS) (not shown) may be used to connect APs 105 in an ESS. A geographic coverage area 110 for an AP 105 may be divided into sectors, with each sector including a portion of the coverage area (not shown). The WLAN 100 may include access points 105 of different types (e.g., metropolitan area, home network, etc.), with varying sizes of coverage areas and overlapping coverage areas for different technologies. Although not shown, other wireless devices can communicate with the AP 105.

While the STAs 115 may communicate with each other through the AP 105 using communication links 120, a STA 115 may also communicate directly with another STA 115 via a direct wireless link 125. Two or more STAs 115 may communicate via a direct wireless link 125 when both STAs 115 are in the geographic coverage area 110 of the AP 105, or when one or neither STA 115 is within the geographic coverage area 110 of the AP 105 (not shown). Examples of direct wireless links 125 may include Wi-Fi Direct connections, connections established using a Wi-Fi Tunneled Direct Link Setup (TDLS) link, and other peer-to-peer (P2P) group connections. The STAs 115 in these examples may communicate according to a WLAN radio and baseband protocol, including physical and MAC layers, described by the IEEE 802.11 family of standards, including, but not limited to, 802.11b, 802.11g, 802.11a, 802.11n, 802.11ac, 802.11ad, 802.11ah, 802.11ax, etc. In other implementations, other P2P connections and/or ad hoc networks may be implemented within the WLAN 100.

In the WLAN 100, the AP 105 may transmit messages to or receive messages from at least one STA 115 according to various versions of the IEEE 802.11 standard, including new wireless standards. The AP 105 may include a transmission opportunity manager 610. The transmission opportunity manager 610 identifies a first set of EDCA parameters for a first access category, where the first access category is based at least in part on a first traffic type and a determination that a MU frame is to be exchanged. The transmission opportunity manager 610 also contends to gain access for a transmission opportunity over a shared radio frequency spectrum band to communicate with a set of the STAs 115 in the MU frame. The contention is based at least in part on the first set of EDCA parameters.

Figure 2A:
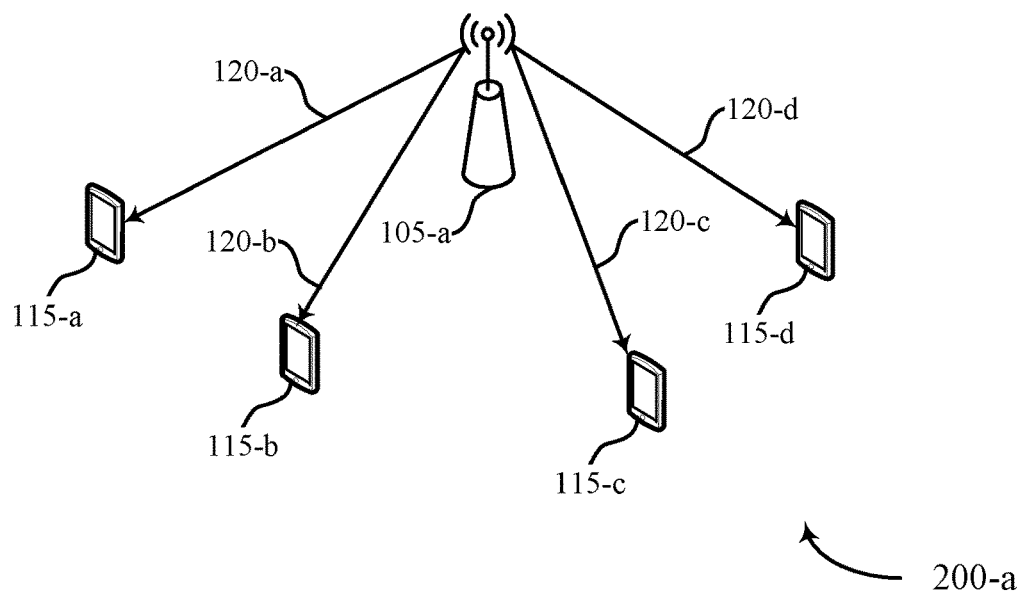
FIG. 2A illustrates multiple user operation of a WLAN, in accordance with various aspects of the present disclosure.

FIG. 2A illustrates multiple user operation of a WLAN 200-a, in accordance with various aspects of the present disclosure. WLAN 200-a includes an AP 105-a and multiple associated STAs 115-a, 115-b, 115-c, and 115-d. AP 105-a and STAs 115-a, 115-b, 115-c, and 115-d may be examples of aspects of the APs 105 and STAs 115 described with reference to FIG. 1.

When operating in a downlink MU mode, the AP 105-a can simultaneously transmit control, management, or data signals to each of the STAs 115-a, 115-b, 115-c, 115-d over respective communication links 120-a, 120-b, 120-c, and 120-d. Some possible downlink MU modes include a DL MU-MIMO mode, a DL OFDMA mode, a combination of both, or another MU mode or modes.

Figure 2B:
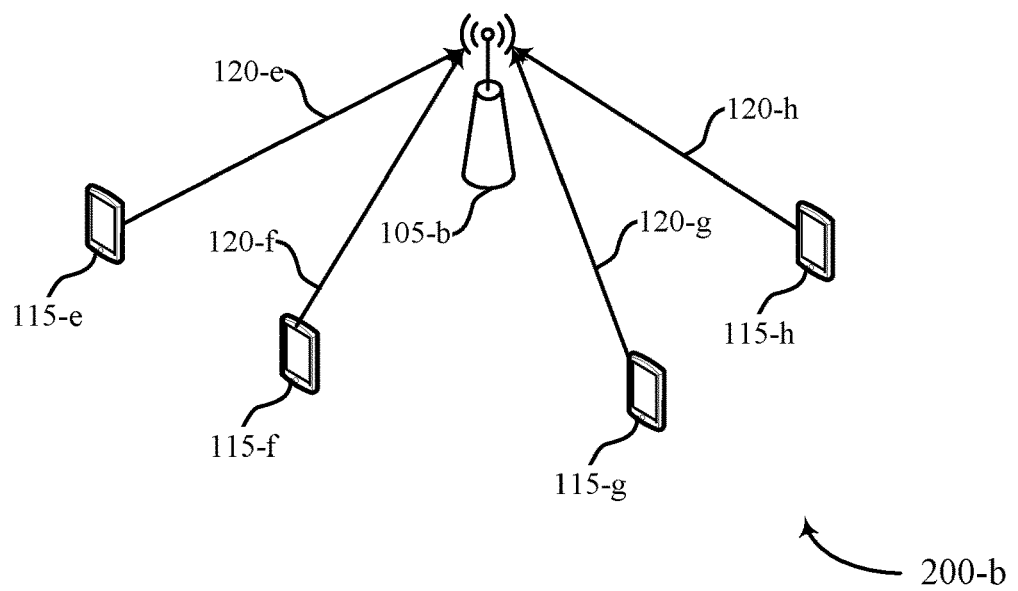
FIG. 2B illustrates multiple user operation of a WLAN, in accordance with various aspects of the present disclosure.

FIG. 2B illustrates multiple user operation of a WLAN 200-b, in accordance with various aspects of the present disclosure. WLAN 200-b includes an AP 105-b and multiple associated STAs 115-e, 115-f, 115-g, and 115-h. AP 105-b and STAs 115-e, 115-f, 115-g, and 115-h may be examples of aspects of the APs 105 and STAs 115 described with reference to FIGS. 1-2.

When operating in an uplink MU mode, the AP 105-b can simultaneously receive control, management, or data signals from each of the STAs 115-e, 115-f, 115-g, 115-h over respective communication links 120-e, 120-f, 120-g, and 120-h. Some possible uplink MU modes include a UL MU-MIMO mode, a UL OFDMA mode, a combination of both, or another MU mode or modes.

Figure 3A:
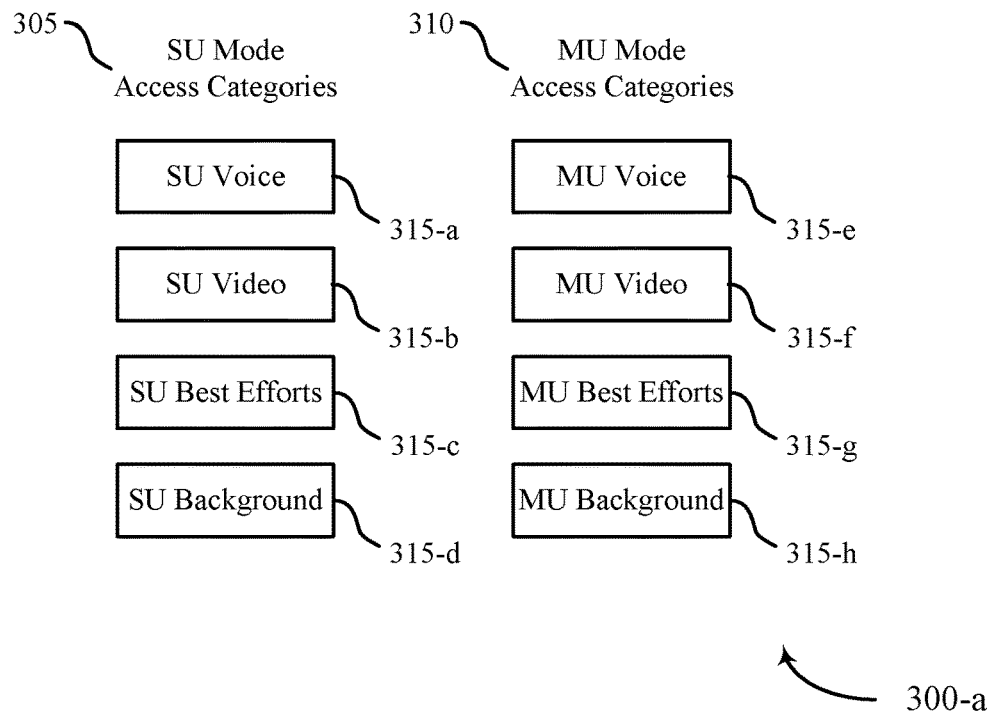
FIG. 3A illustrates an example set of access categories used by an AP to contend to gain access for a transmission opportunity of a shared radio frequency spectrum band, in accordance with various aspects of the present disclosure.
Figure 3B:
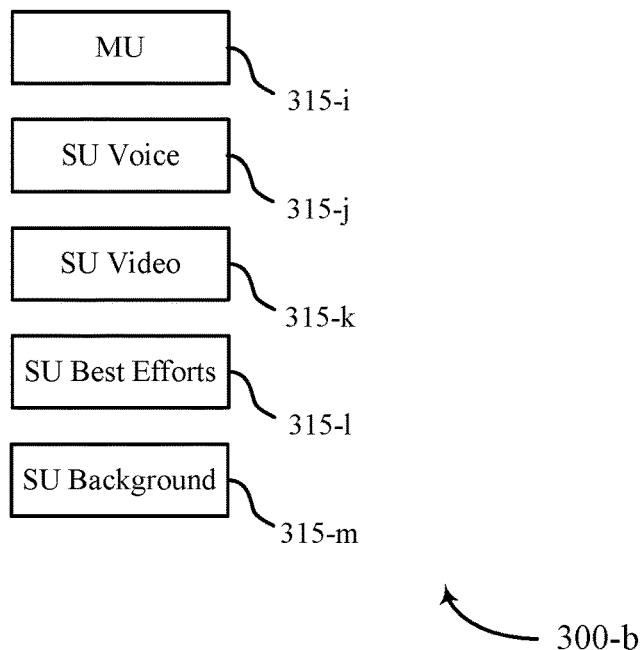
FIG. 3B illustrates an example set of access categories used by an AP to contend to gain access for a transmission opportunity of a shared radio frequency spectrum band, in accordance with various aspects of the present disclosure.

When operating in one of the MU modes described with reference to FIG. 2A or 2B, the AP 105 contends to gain access for a transmission opportunity over a shared radio frequency spectrum band. Upon winning contention to gain access for the transmission opportunity, the AP 105 communicates with the STAs 115 during the MU transmission opportunity. In some examples, the AP 105 uses a set of enhanced distributed channel access (EDCA) parameters to contend to gain access for the transmission opportunity. The EDCA parameters that are used are associated with an access category and are identified based at least in part on a traffic type and a determination that at least a frame to be transmitted during the transmission opportunity is transmitted in a MU mode. FIGS. 3A and 3B illustrate examples of how the set of EDCA parameters may be identified.

Although FIGS. 2A and 2B refer to an AP 105 in communication with multiple STAs 115, the AP 105 may, in some alternatives, be replaced with any STA that intends to communicate with one or more other STAs in a MU mode.

FIG. 3A illustrates an example set of access categories 300-a used by an AP to contend to gain access for a transmission opportunity of a shared radio frequency spectrum band, in accordance with various aspects of the present disclosure. The set of access categories 300-a includes a subset of single user (SU) access categories 305 and a subset of MU access categories 310. The subset of SU access categories 305 includes access categories for different traffic types, and more specifically includes an SU voice access category 315-a, an SU video access category 315-b, an SU best efforts access category 315-c, and an SU background access category 315-d. The subset of MU access categories 310 also includes access categories for different traffic types, and more specifically includes an MU voice access category 315-e, an MU video access category 315-f, an MU best efforts category 315-g, and an MU background access category 315-h.

Each of the access categories is associated with a set of EDCA parameters that provides an access priority to the shared radio frequency spectrum band (e.g., a priority, with respect to other access categories, for accessing a transmission opportunity of the shared radio frequency spectrum band). In some examples, the EDCA parameters associated with the SU access categories 305 may provide a highest access priority to the SU voice access category 315-a, a second highest access priority to the SU video access category 315-b, a third highest access priority to the SU best efforts access category 315-c, and a lowest access priority to the SU background access category 315-d. In alternative embodiments, the access priorities of the SU access categories 305 may be ranked differently. The EDCA parameters associated with the MU access categories 310 may provide a similar or different ranking of access priorities to the MU access categories 310. For access categories associated with a same traffic type (e.g., the SU voice access category 315-a and the MU voice access category 315-e), the EDCA parameters associated with the access categories may provide a same access priority to the shared radio frequency spectrum band. Alternatively, the EDCA parameters associated with the MU access category may provide a higher or lower access priority to the MU access category compared to the SU access category. Providing a higher access priority to an MU access category acknowledges that an MU frame provides communications between a greater number of devices. Providing a lower access priority to an MU access category provides additional fairness of access to legacy devices that are not MU capable. A set of EDCA parameters may be a linear function of a parameter such as an associated access category or the number of STAs with which the AP intends to communicate during a frame.

FIG. 3B illustrates an example set of access categories 300-b used by an AP to contend to gain access for a transmission opportunity of a shared radio frequency spectrum band, in accordance with various aspects of the present disclosure. The set of access categories 300-b includes access categories for different traffic types, and more specifically includes an MU access category 315-i, an SU voice access category 315-j, an SU video access category 315-k, an SU best efforts access category 315-l, and an SU background access category 315-m. The MU access category 315-i is associated with all MU traffic types (e.g., voice, video, best efforts, and background).

Each of the access categories is associated with a set of EDCA parameters that provides an access priority to the shared radio frequency spectrum band. In some examples, a highest access priority is provided to the MU access category 315-i, a second highest priority is provided to the SU voice access category 315-j, a third highest access priority is provided to the SU video access category 315-k, a fourth highest access priority is provided to the SU best efforts access category 315-l, and a lowest access priority is provided to the SU background access category 315-m. In alternative embodiments, the access priorities of the access categories may be ranked differently. A set of EDCA parameters may be a linear function of a parameter such as an associated access category or the number of STAs with which the AP intends to communicate during a frame.

In some examples, a queue (i.e., a traffic queue) is associated with each of the access categories. In these examples, an identifier of an SU or MU frame may be input to an appropriate queue, and a set of EDCA parameters associated with the queue (and the access category associated with the queue) may be identified when contending to gain access for a transmission opportunity for the frame.

Whether using the access categories shown in FIG. 3A or 3B, an AP determining to transmit a SU or MU frame associated with a traffic type identifies a set of EDCA parameters for an access category that is based at least in part on the traffic type, and in part on the determination to transmit the SU or MU frame. The AP then uses the set of EDCA parameters contends to gain access for a transmission opportunity over the shared radio frequency spectrum band, to communicate with a STA (in an SU frame) or a set of STAs (in an MU frame). The AP and STA(s) may be examples of aspects of the APs 105 and STAs 115 described with reference to FIGS. 1-2.

Figure 4:
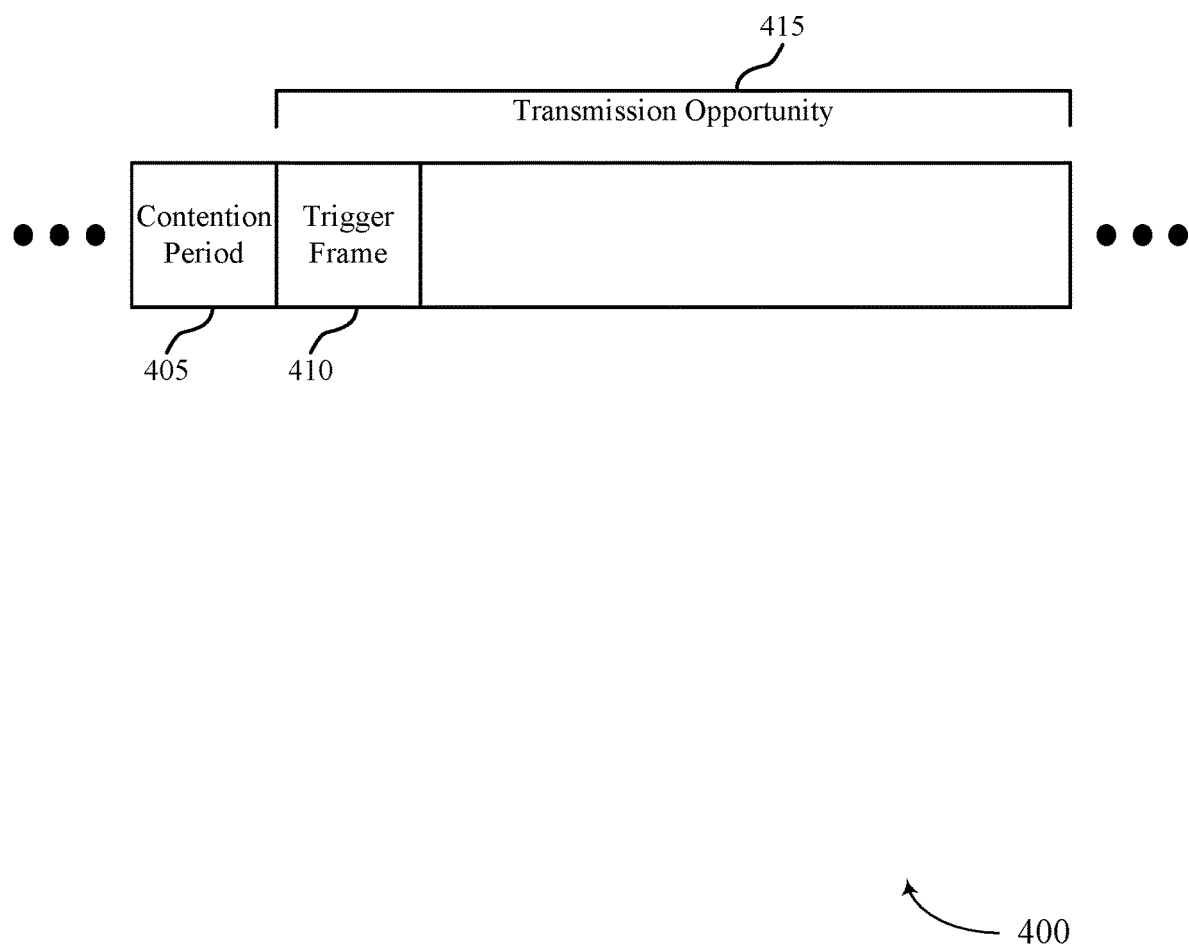
FIG. 4 illustrates an example timeline of communications between an AP and number of STAs over a shared radio frequency spectrum band, in accordance with various aspects of the present disclosure.

FIG. 4 illustrates an example timeline 400 of communications between an AP and number of STAs over a shared radio frequency spectrum band, in accordance with various aspects of the present disclosure. The AP and STA(s) may be examples of aspects of the APs 105 and STAs 115 described with reference to FIGS. 1-2. By way of example, the timeline 400 comprises a contention period 405 and a transmission opportunity (TxOP) 415 including an optional trigger frame transmission period 410.

During the contention period 405, the AP, along with other devices (e.g., other APs and/or other STAs), contends to gain access to the shared radio frequency spectrum band for the transmission opportunity 415. When contending for the transmission opportunity 415, the AP uses a set of EDCA parameters for an access category that is based at least in part on a traffic type, and in part on a determination to communicate (e.g., transmit or receive) using a SU or MU frame. When determining to communicate using an MU frame, the EDCA parameters are based at least in part on a traffic type and the determination that the frame is an MU frame.

Upon winning contention to gain access for the transmission opportunity 415 for an MU frame, the AP optionally transmits a trigger frame during the trigger frame transmission period 410. The trigger frame is transmitted to the STAs with which the AP will communicate (e.g., to a set of receiving STAs when the MU frame is a downlink MU frame, to a set of transmitting STAs when the MU frame is an uplink MU frame, or both). The trigger frame is a polling frame that may allocate resources to the STAs and explicitly or implicitly indicate what type of traffic the STAs can transmit during the transmission opportunity 415. The trigger frame may also indicate the traffic type on which the contention for access was based. The traffic type on which the contention for access was based may be referred to herein as the primary traffic type. The trigger frame may indicate whether the exchanges that are allowed during the transmission opportunity are access category (AC) constrained or not. Similarly, the trigger frame may indicate whether the exchanges that are allowed during the transmission opportunity are traffic type (TID) constrained or not.

During the transmission opportunity, the AP communicates with a number of STAs in a SU or MU frame. When communicating in a MU frame, the AP may transmit to a set of receiving STAs or receive from a set of transmitting STAs. Depending on a rule set used by the AP and/or STAs, the AP may transmit or receive any traffic type, regardless of having used the primary traffic type when identifying a set of EDCA parameters used for contending to gain access for the transmission opportunity 415. In certain embodiments, this may be signaled by indicating in the trigger frame that the exchanges during the transmission opportunity 415 are not AC (or TID) constrained. The transmission or reception of any traffic type may maximize resource utilization and provide greater flexibility. Alternatively, the AP may be required to transmit or receive at least one transmission of the primary traffic type, followed by transmissions or receptions of any traffic type (i.e., secondary traffic types). In certain embodiments, this may be signaled by indicating in the trigger frame that the exchanges during the transmission opportunity 415 are AC (or TID) configured. Alternatively, the AP may be required to transmit or receive at least one transmission of the primary traffic type or a higher access priority, followed by transmissions or receptions of any traffic type (i.e., secondary traffic types). When a STA is allowed to transmit on an uplink during an uplink MU frame, a rule set used by the STA may in some cases prohibit the STA from transmitting when the STA does not have traffic of the primary traffic type to transmit. A rule set used by the STA may alternatively allow the STA to only transmit control frames or management frames when the STA does not have traffic of the primary traffic type to transmit. A rule set used by the STA may alternatively allow the STA to only transmit frames with higher priority than the primary traffic type.

Figure 5:
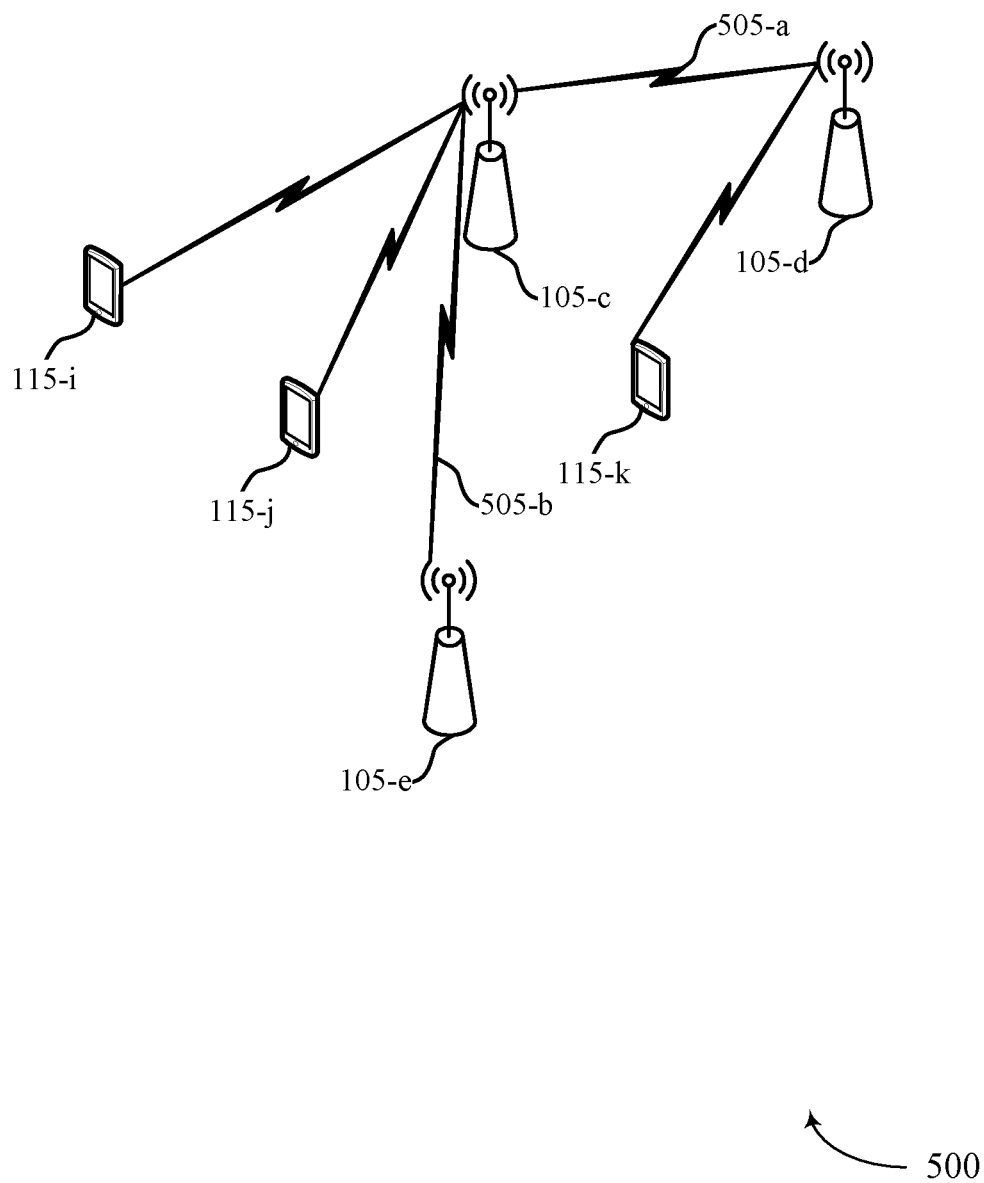
FIG. 5 illustrates coordination between APs in a WLAN, in accordance with various aspects of the present disclosure.

FIG. 5 illustrates coordination between APs in a WLAN 500, in accordance with various aspects of the present disclosure. WLAN 500 includes a first AP 105-*c*, a second AP 105-*d*, and a third AP 105-*e*. Each AP is associated with a different basic service set (BSS). The first AP 105-*c* is associated with a first STA 115-*i* and a second STA 115-*j*, and the second AP 105-*d* is associated with a third STA 115-*k*. The APs 105-*c*, 105-*d*, 105-*e* and STAs 115-*i*, 115-*j*, 115-*k* may be examples of aspects of the APs 105 and STAs 115 described with reference to FIGS. 1-2.

When an APs 105-*c*, 105-*d*, or 105-*e* wins contention to gain access for a transmission opportunity over a shared radio frequency spectrum band, the AP may transmit a trigger frame to a set of STAs with which it intends to communicate, as described with reference to FIG. 4. In some examples, an AP may contend to gain access for a transmission opportunity in one channel (e.g., a primary channel) but transmit a trigger frame over multiple channels. This may cause STAs 115 of other BSSs to transmit packets at inappropriate times. Inter-AP coordination may help to alleviate this problem.

In one form of inter-AP coordination, STAs report to their APs the primary traffic types indicated in trigger frames of APs associated with other BSSs, and in some cases whether the APs of other BSSs use AC constrained rules. For example, the STA 115-*j* may report to the AP 105-*c* the primary traffic type indicated in a trigger frame of the AP 105-*e*. The AP 105-*c* then communicates with the neighboring AP (e.g., AP 105-*e*), or with a set of neighboring APs (e.g., AP 105-*d* and AP 105-*e*) to negotiate one or more sets of EDCA parameters with the neighboring AP(s). The AP 105-*c* may communicate with the AP 105-*d* or AP 105-*e* over wired (e.g., backhaul) or wireless communication links 505-*a* and 505-*b*. The EDCA parameters may be negotiated to provide fair access to transmission opportunities over the shared radio frequency spectrum band. In some examples, the negotiated set(s) of EDCA parameters include one or more sets of EDCA parameters for one or more access categories based on a determination that a frame is an MU frame. In certain embodiments, the APs coordinate with each other to constrain or release AC constraints for MU modes.

In another form of inter-AP coordination, the APs 105-*c*, 105-*d*, and 105-*e* use default sets of EDCA parameters and are not allowed to change the sets of EDCA parameters during the existence of a BSS for transmissions of MU frames. However, the APs 105-*c*, 105-*d*, and 105-*e* may in some cases change their EDCA parameters for SU transmissions. This form of inter-AP coordination can preserve differentiation of the sets of EDCA parameters used by the APs for their primary traffic types in MU modes.

As an alternative to inter-AP coordination, an AP that detects aggressive behavior from a neighboring AP can instruct its associated STAs to discard frames transmitted to or from the neighboring AP. In some examples, the discarding of frames may be based on the COLOR field of a physical (PHY) header, which COLOR field may identify a BSS other than the BSS used by the AP detecting the aggressive behavior. Upon discarding a frame, a STA may transmit on top of the frame.

Figure 6:
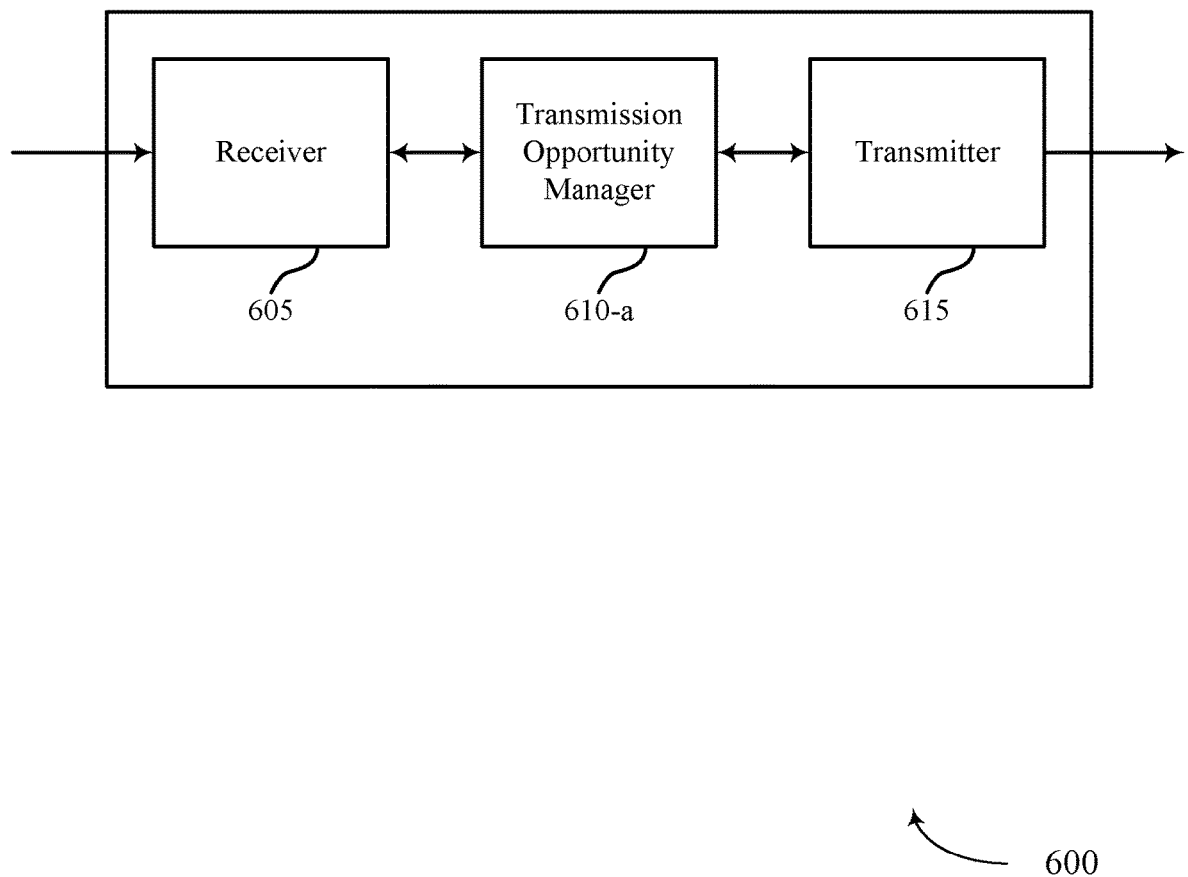
FIG. 6 shows a block diagram of a wireless device, in accordance with various aspects of the present disclosure.

FIG. 6 shows a block diagram of a wireless device 600, in accordance with various aspects of the present disclosure. Wireless device 600 may be an example of aspects of the APs 105 described with reference to FIGS. 1-2 and 5. Wireless device 600 may also be a STA 115. Wireless device 600 includes a receiver 605, a transmission opportunity manager 610, and a transmitter 615. Wireless device 600 may also include a processor. Each of these components may be in communication with each other.

The receiver 605 receives information such as packets, user data, or control information associated with various information channels (e.g., control channels, data channels, etc.). Some of the information includes information received in a SU or MU frame. Some information may be passed to the transmission opportunity manager 610, or to other components of wireless device 600.

The transmission opportunity manager 610 identifies a first set of EDCA parameters for a first access category based at least in part on a first traffic type and a determination that a MU frame is to be transmitted. The transmission opportunity manager 610 also contends to gain access for a transmission opportunity over a shared radio frequency spectrum band to communicate with the plurality of stations in a MU mode. The contention is based at least in part on the first set of EDCA parameters.

The transmitter 615 transmits signals received from other components of wireless device 600. In some examples, the transmitter 615 is collocated with the receiver 605 in a transceiver module. The transmitter 615 may include a single antenna or multiple antennas.

Figure 7:
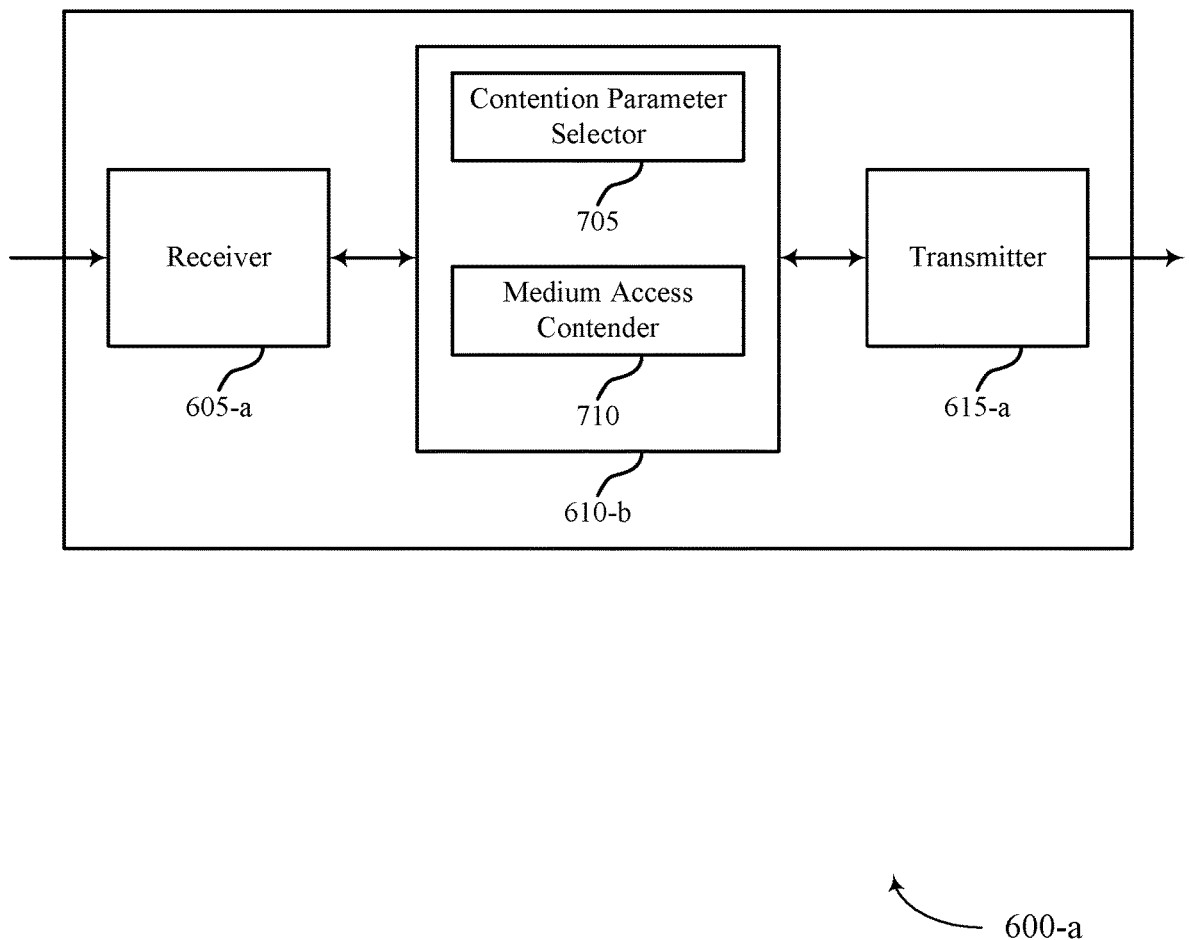
FIG. 7 shows a block diagram of a wireless device, in accordance with various aspects of the present disclosure.

FIG. 7 shows a block diagram of a wireless device 600-*a*, in accordance with various aspects of the present disclosure. Wireless device 600-*a* may be an example of aspects of the wireless device 600 or APs 105 described with reference to FIGS. 1-2 and 5-6. Wireless device 600-*a* may also be a STA 115. Wireless device 600-*a* includes a receiver 605-*a*, a transmission opportunity manager 610-*b*, and a transmitter 615-*a*. Wireless device 600-*a* may also include a processor. Each of these components may be in communication with each other. As shown, the transmission opportunity manager 610-*b* may include a contention parameter selector 705 and a medium access contender 710.

The receiver 605-*a* receives information which is passed to transmission opportunity manager 610-*b*, or to other components of wireless device 600-*a*. The transmission opportunity manager 610-*b* performs the operations described with reference to FIG. 6. The transmitter 615-*a* transmits signals received from other components of wireless device 600-*a*.

The contention parameter selector 705 identifies a first set of EDCA parameters for a first access category based at least in part on a first traffic type and a determination that a MU frame is to be exchanged with a set of STAs, as described with reference to FIGS. 2-3. In some examples, the first set of EDCA parameters provides a same access priority to the shared radio frequency spectrum band as a second set of EDCA parameters for a second access category, where the second access category is based at least in part on the first traffic type and a determination that the frame is an SU frame, as described with reference to FIGS. 3A and 3B. Alternatively, the first set of EDCA parameters provides a higher access priority or a lower access priority than the second set of EDCA parameters, as also described with reference to FIGS. 3A and 3B. The contention parameter selector 705 may also input an identifier of the MU frame to an MU queue and identify the first set of EDCA parameters as a set of EDCA parameters associated with the MU queue. In some examples, the first set of EDCA parameters may be a linear function of a parameter such as the first access category or a number of the set of STAs. The MU mode can be a DL OFDMA mode, a UL OFDMA mode, a DL MU-MIMO mode, or a UL MU-MIMO mode, as described with reference to FIGS. 2A and 2B.

The medium access contender 710 contends to gain access for a transmission opportunity over a shared radio frequency spectrum band to communicate with the set of STAs in a MU mode. The contention is based at least in part on the first set of EDCA parameters, as described with reference to FIGS. 3-4.

Figure 8A:
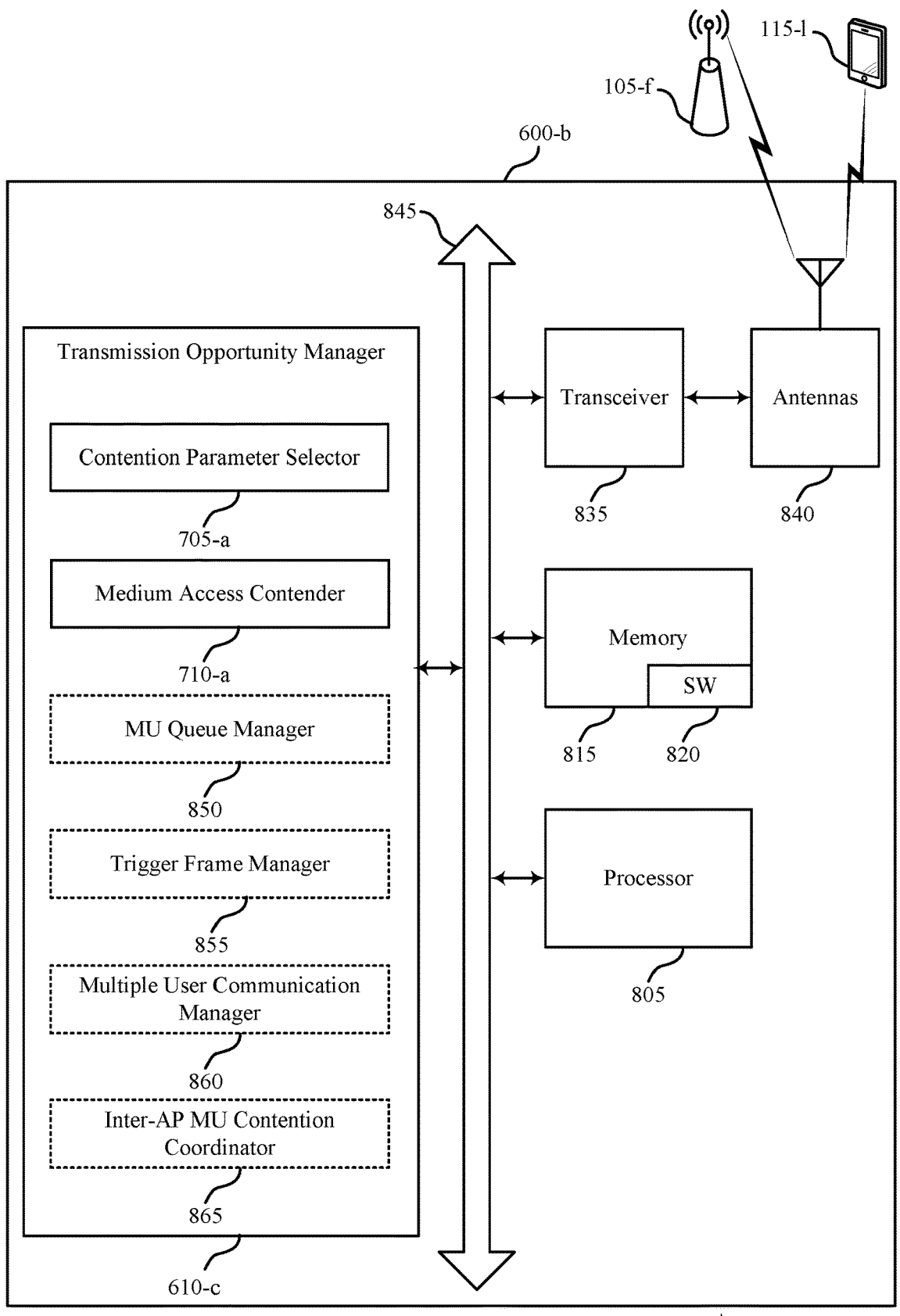
FIG. 8A shows a diagram of a system including a wireless device, in accordance with various aspects of the present disclosure.

FIG. 8A shows a diagram of a system 800-*a* including a wireless device 600-*b*, in accordance with various aspects of the present disclosure. The wireless device 600-*b* may be an example of aspects of the wireless devices 600 or APs 105 described with reference to FIGS. 1-2 and 5-7. Wireless device 600-*b* may also be a STA 115. The transmission opportunity manager 610-*c* may be an example of aspects of the transmission opportunity managers 610 described with reference to FIGS. 6-7. The transmission opportunity manager 610-*c* includes a contention parameter selector 705-*a* and a medium access contender 710-*a*. Each of these modules performs the functions described with reference to FIG. 7. The transmission opportunity manager 610-*c* may also include an MU queue manager 850, a trigger frame manager 855, a multiple user communication manager 860, or an inter-AP MU contention coordinator 865. The wireless device 600-*b* also includes components for bi-directional voice and data communications, including components for transmitting communications and components for receiving communications. For example, wireless device 600-*b* communicates bi-directionally with STA 115-*l* and AP 105-*f*.

The wireless device 600-*b* includes a processor 805, memory 815 (storing software (SW) 820), a transceiver 835, one or more antenna(s) 840, and a transmission opportunity manager 610-*c*, each of which may communicate, directly or indirectly, with one another (e.g., via buses 845). The transceiver 835 communicates bi-directionally, via the antenna(s) 840 or wired or wireless links, with one or more networks, as described above. For example, the transceiver 835 communicates bi-directionally with STA 115-*l* and AP 105-*f*. The transceiver 835 includes a modem to modulate packets and provide the modulated packets to the antenna(s) 840 for transmission, and to demodulate packets received from the antenna(s) 840. While the wireless device 600-*b* is shown to have a single antenna 840, the wireless device 600-*b* may also have multiple antennas 840 capable of concurrently transmitting or receiving multiple wireless transmissions.

The memory 815 may include random access memory (RAM) or read-only memory (ROM). The memory 815 may store computer-readable, computer-executable software/firmware code 820 including instructions that, when executed, cause the processor 805 to perform various functions described herein (e.g., contending to gain access for a transmission opportunity over a shared radio frequency spectrum band to communicate with a set of STAs in a MU mode, etc.). Alternatively, the computer-executable software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.).

The transmission opportunity manager 610-*c* performs the operations described with reference to FIGS. 6 and 7 and includes a contention parameter selector 705-*a*, a medium access contender 710-*a*, an MU queue manager 850, a trigger frame manager 855, a multiple user communication manager 860, and an inter-AP MU contention coordinator 865.

The MU queue manager 850 manages a plurality of transmission queues associated with different sets of EDCA parameters and access categories. In some cases, the MU queue manager 850 manages an MU queue associated with a set of EDCA parameters for a first access category, which first access category is based on one or more traffic types, as described with reference to FIG. 3B. The trigger frame manager 855 transmits a trigger frame to a set of STAs (e.g., a set of receiving STAs or a set of transmitting STAs) upon winning contention to gain access for a transmission opportunity to transmit an MU frame over a shared radio frequency spectrum band, as described with reference to FIG. 4. In some examples, the trigger frame includes an indication of a first traffic type on which contention to gain access for the shared radio frequency spectrum band was based. The multiple user communication manager 860 communicates with the set of STAs in a MU mode. The inter-AP MU contention coordinator 865 communicates with a neighboring AP (or a set of neighboring APs) to negotiate one or more sets of EDCA parameters for one or more access categories, as described with reference to FIG. 5.

Figure 8B:
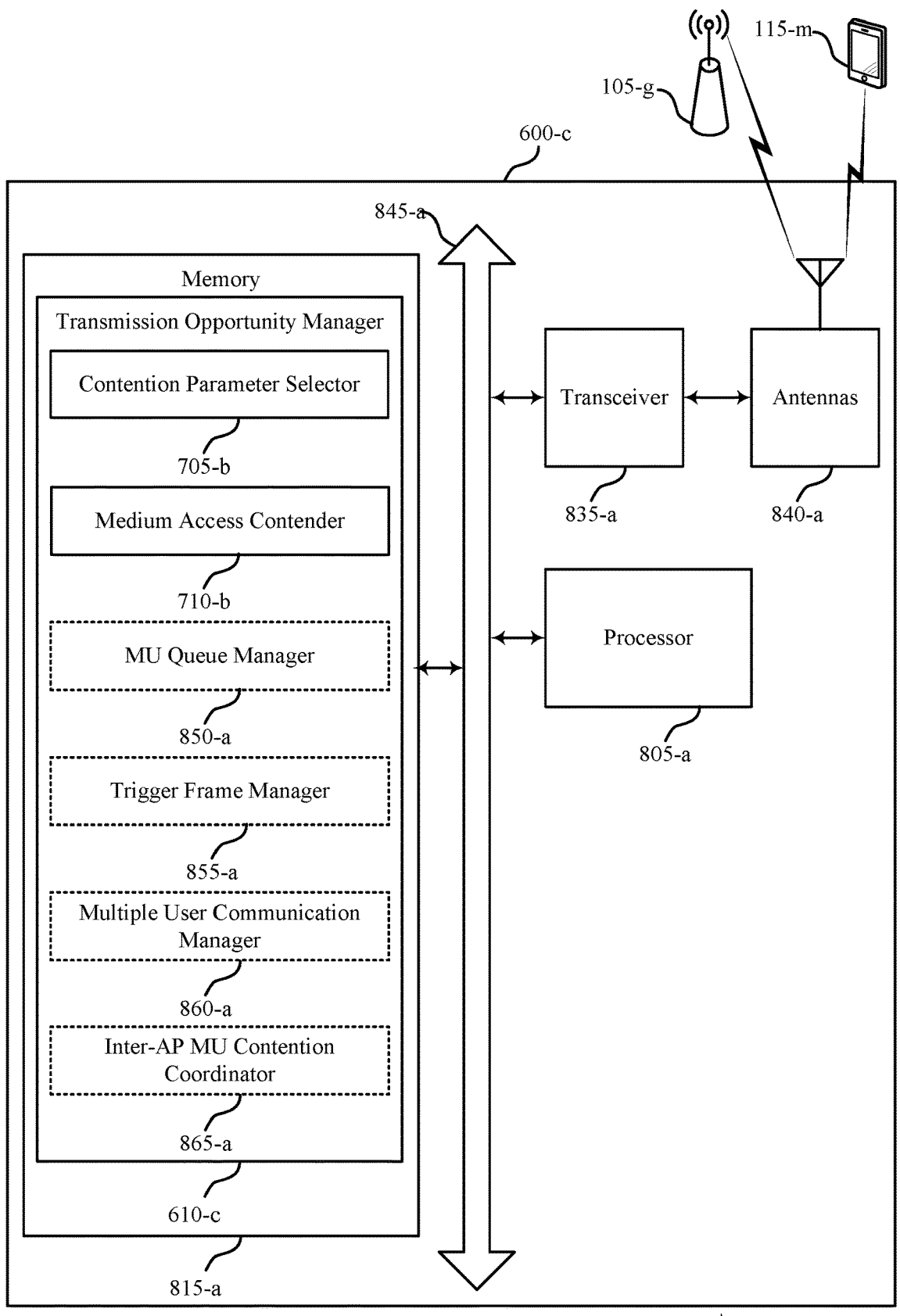
FIG. 8B shows a diagram of a system including a wireless device, in accordance with various aspects of the present disclosure.

FIG. 8B shows a diagram of a system 800-*b* including a wireless device 600-*c*, in accordance with various aspects of the present disclosure. The wireless device 600-*c* may be an example of aspects of the wireless devices 600 or APs 105 described with reference to FIGS. 1-2, 5-7, and 8A. Wireless device 600-*c* may also be a STA 115. The transmission opportunity manager 610-*d* may be an example of aspects of the transmission opportunity managers 610 described with reference to FIGS. 6, 7, and 8A. The transmission opportunity manager 610-*d* includes a contention parameter selector 705-*b* and a medium access contender 710-*b*. Each of these modules performs the functions described with reference to FIG. 7. The transmission opportunity manager 610-*d* may also include an MU queue manager 850-*a*, a trigger frame manager 855-*a*, a multiple user communication manager 860-*a*, or an inter-AP MU contention coordinator 865-*a*. Each of these modules performs the functions described with reference to FIG. 8A. The wireless device 600-*c* also includes components for bi-directional voice and data communications, including components for transmitting communications and components for receiving communications.

For example, wireless device 600-*c* communicates bi-directionally with STA 115-*m* and AP 105-*g*.

The wireless device 600-*c* includes a processor 805-*a*, memory 815-*a*, a transceiver 835-*a*, one or more antenna(s) 840-*a*, and a transmission opportunity manager 610-*d*, each of which may communicate, directly or indirectly, with one another (e.g., via buses 845-*a*). The transceiver 835-*a* communicates bi-directionally, via the antenna(s) 840-*a* or wired or wireless links, with one or more networks, as described above. For example, the transceiver 835-*a* communicates bi-directionally with STA 115-*m* and AP 105-*g*. The transceiver 835-*a* includes a modem to modulate packets and provide the modulated packets to the antenna(s) 840-*a* for transmission, and to demodulate packets received from the antenna(s) 840-*a*. While the wireless device 600-*c* is shown to have a single antenna 840-*a*, the wireless device 600-*c* may also have multiple antennas 840-*a* capable of concurrently transmitting or receiving multiple wireless transmissions.

The memory 815-*a* may include random access memory (RAM) or read-only memory (ROM). The memory 815-*a* may store computer-readable, computer-executable software/firmware code including instructions that, when executed, cause the processor 805-*a* to perform various functions described herein (e.g., contending to gain access for a transmission opportunity over a shared radio frequency spectrum band to communicate with a set of STAs in a MU mode, etc.). Alternatively, the computer-executable software/firmware code may not be directly executable by the processor 805-*a* but cause a computer (e.g., when compiled and executed) to perform functions described herein. The processor 805-*a* may include an intelligent hardware device, (e.g., a central processing unit (CPU), a microcontroller, an ASIC, etc.). In the example of FIG. 8B, the contention parameter selector 705-*b*, medium access contender 710-*b*, MU queue manager 850-*a*, trigger frame manager 855-*a*, multiple user communication manager 860-*a*, and inter-AP MU contention coordinator 865-*a* are implemented as software/firmware code executable by the processor 805-*a*.

The components of the wireless devices 600 or transmission opportunity manager 610 may be implemented, individually or collectively, with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 9:
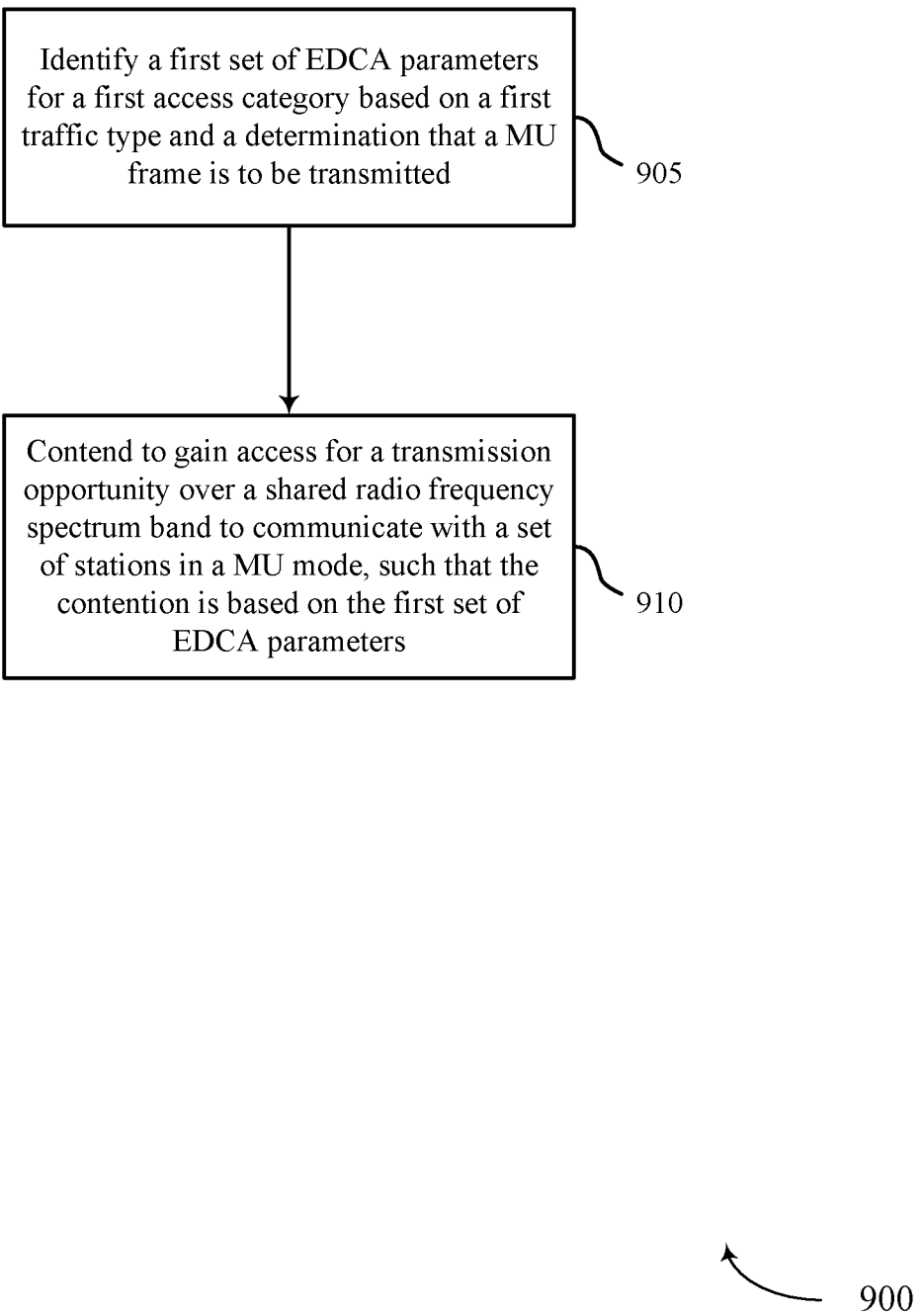
FIG. 9 shows a flowchart illustrating a method for wireless communication, in accordance with various aspects of the present disclosure.

FIG. 9 shows a flowchart illustrating a method 900 for wireless communication, in accordance with various aspects of the present disclosure. The operations of method 900 may be implemented by a wireless device 600, AP 105, STA 115, or components thereof, as described with reference to FIGS. 1-8. In some examples, the operations of method 900 may be performed by the transmission opportunity manager 610 described with reference to FIGS. 6-8. In some examples, a wireless device 600 or AP 105 may execute a set of codes to control the elements of the wireless device 600 or AP 105 to perform the functions described below. Additionally or alternatively, the wireless device 600 or AP 105 may perform aspects of the functions described below using special-purpose hardware.

At block 905, the wireless device 600 or AP 105 identifies a first set of EDCA parameters for a first access category based at least in part on a first traffic type and a determination that a MU frame is to be transmitted, as described with reference to FIGS. 2-3. In certain examples, the operations of block 905 may be performed by the contention parameter selector 705 described with reference to FIG. 7. At block 910, the wireless device 600 or AP 105 contends to gain access for a transmission opportunity over a shared radio frequency spectrum band to communicate with a set of STAs in a MU mode. The contention is based at least in part on the first set of EDCA parameters, as described with reference to FIGS. 3-4. In certain examples, the operations of block 910 may be performed by the medium access contender 710 described with reference to FIG. 7.

Figure 10:
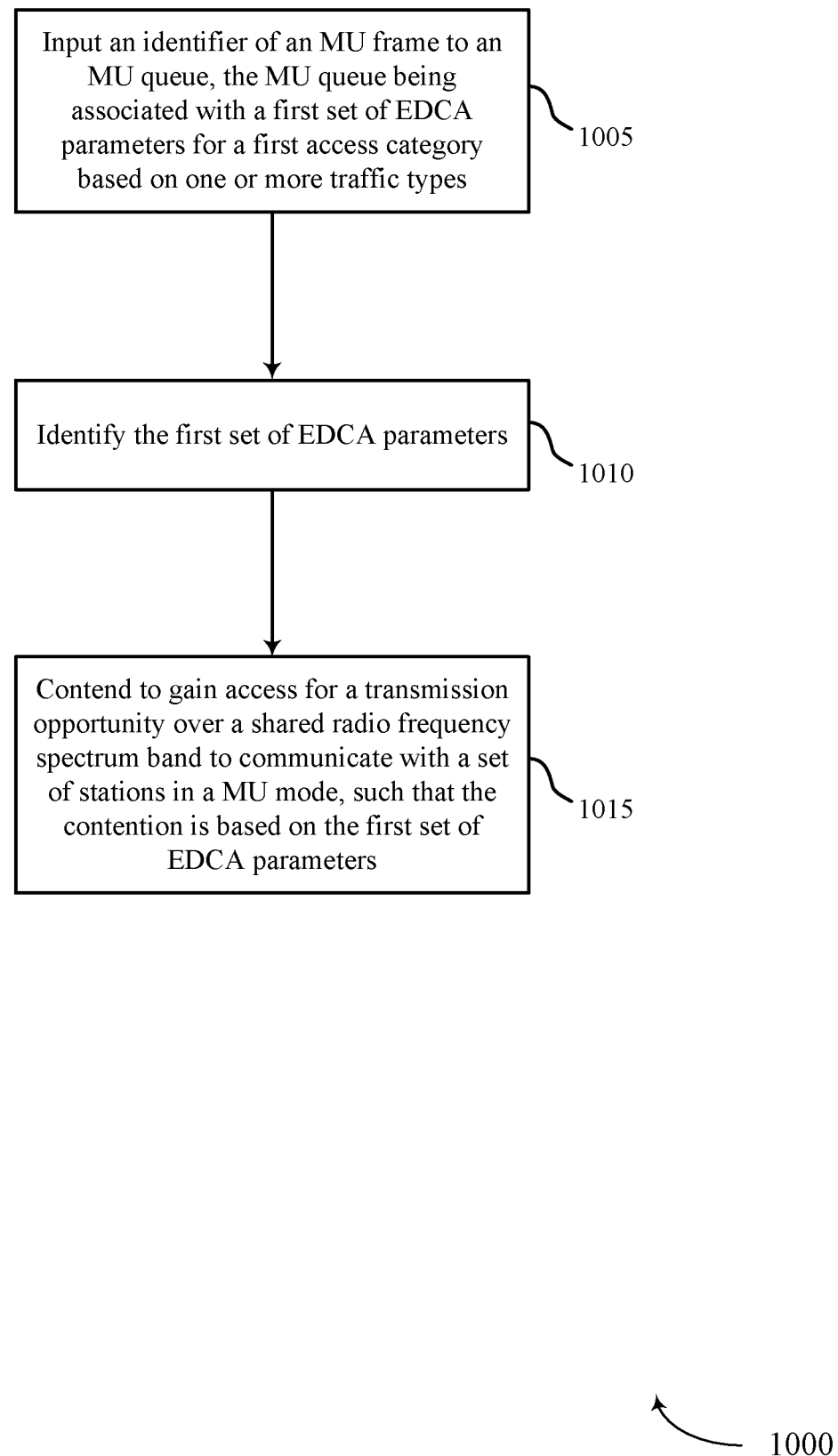
FIG. 10 shows a flowchart illustrating a method for wireless communication, in accordance with various aspects of the present disclosure.

FIG. 10 shows a flowchart illustrating a method 1000 for wireless communication, in accordance with various aspects of the present disclosure. The operations of method 1000 may be implemented by a wireless device 600, AP 105, STA 115, or components thereof, as described with reference to FIGS. 1-8. In some examples, the operations of method 1000 may be performed by the transmission opportunity manager 610 described with reference to FIGS. 6-8. In some examples, a wireless device 600 or AP 105 may execute a set of codes to control the elements of the wireless device 600 or AP 105 to perform the functions described below. Additionally or alternatively, the wireless device 600 or AP 105 may perform aspects of the functions described below using special-purpose hardware. The method 1000 may also incorporate aspects of method 900 of FIG. 9.

At block 1005, the wireless device 600 or AP 105 inputs an identifier of an MU frame to an MU queue, as described with reference to FIG. 3B. The MU queue is associated with a first set of EDCA parameters for a first access category, which first access category is based on one or more traffic types. In certain examples, the operations of block 1005 may be performed by the MU queue manager 850 described with reference to FIGS. 8A and 8B. At block 1010, the wireless device 600 or AP 105 identifies the first set of EDCA parameters, as described with reference to FIG. 3B. In certain examples, the operations of block 1010 may be performed by the contention parameter selector 705 described with reference to FIG. 7. At block 1015, the wireless device 600 or AP 105 contends to gain access for a transmission opportunity over a shared radio frequency spectrum band to communicate with a set of STAs in a MU mode. The contention is based at least in part on the first set of EDCA parameters, as described with reference to FIGS. 3B and 4. In certain examples, the operations of block 1015 may be performed by the medium access contender 710 described with reference to FIG. 7.

Figure 11:
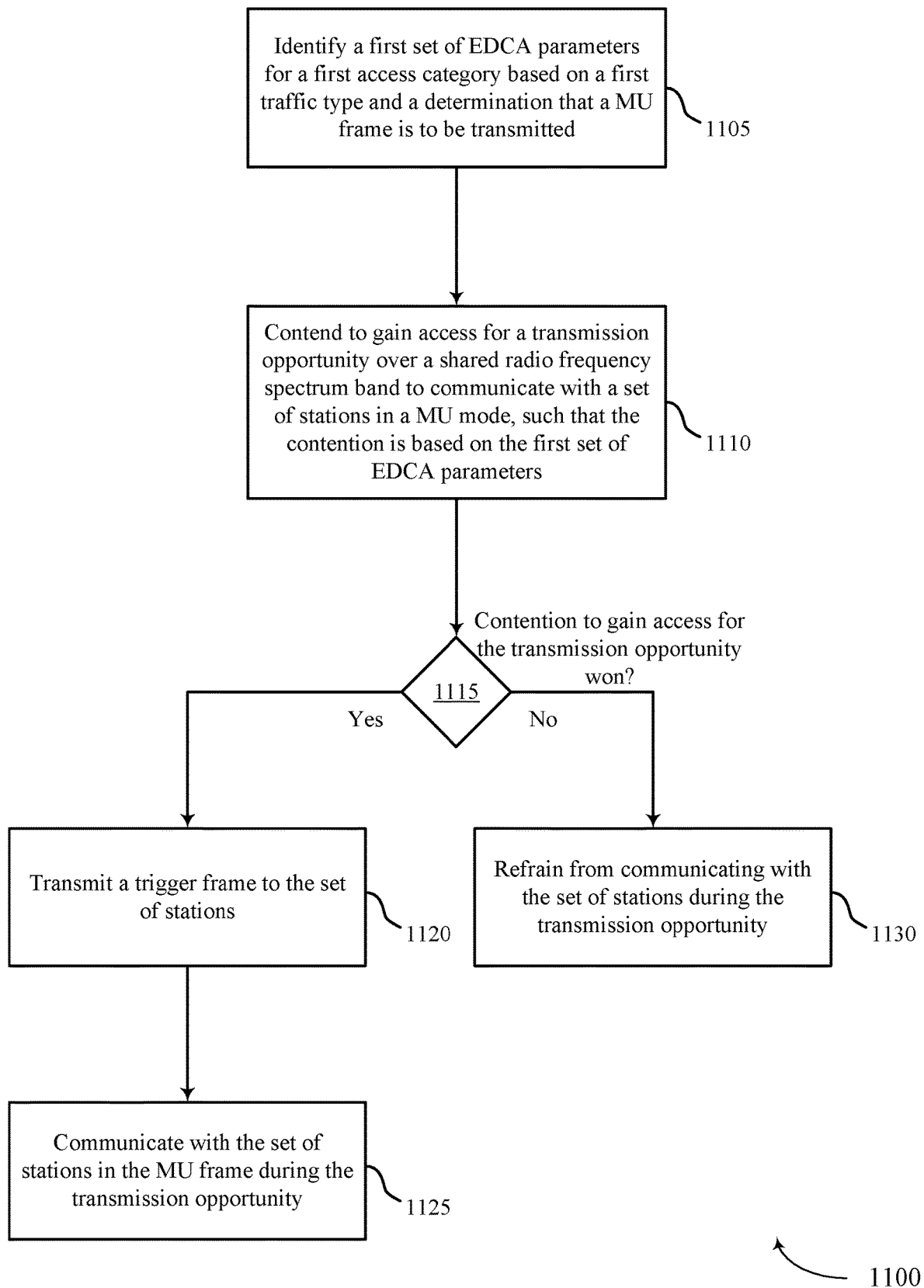
FIG. 11 shows a flowchart illustrating a method for wireless communication, in accordance with various aspects of the present disclosure.

FIG. 11 shows a flowchart illustrating a method 1100 for wireless communication, in accordance with various aspects of the present disclosure. The operations of method 1100 may be implemented by a wireless device 600, AP 105, STA 115, or components thereof, as described with reference to FIGS. 1-8. In some examples, the operations of method 1100 may be performed by the transmission opportunity manager 610 described with reference to FIGS. 6-8. In some examples, a wireless device 600 or AP 105 may execute a set of codes to control the elements of the wireless device 600 or AP 105 to perform the functions described below. Additionally or alternatively, the wireless device 600 or AP 105 may perform aspects of the functions described below using special-purpose hardware. The method 1100 may also incorporate aspects of method 900 or 1000 of FIG. 9 or 10.

At block 1105, the wireless device 600 or AP 105 identifies a first set of EDCA parameters for a first access category based at least in part on a first traffic type and a determination that a MU frame is to be transmitted, as described with reference to FIGS. 2-3. In certain examples, the operations of block 1105 may be performed by the contention parameter selector 705 described with reference to FIG. 7. At block 1110, the wireless device 600 or AP 105 contends to gain access for a transmission opportunity over a shared radio frequency spectrum band to communicate with the set of STAs in a MU mode. The contention is based at least in part on the first set of EDCA parameters, as described with reference to FIGS. 3-4. In certain examples, the operations of block 1110 may be performed by the medium access contender 710 described with reference to FIG. 7. At block 1115, the wireless device 600 or AP 105 determines whether contention to gain access for the transmission opportunity has been won. When contention to gain access for the transmission opportunity is won, the wireless device 600 or AP 105 transmits a trigger frame to the set of STAs (at block 1120) and communicates with the set of STAs in the MU mode during the transmission opportunity (at block 1125), as described with reference to FIG. 4. In certain examples, the operations of block 1120 may be performed by the trigger frame manager 855 described with reference to FIGS. 8A and 8B, and the operations of block 1125 may be performed by the multiple user communication manager 860 described with reference to FIGS. 8A & 8B. At block 1130, the wireless device 600 or AP 105 refrains from communicating with the set of STAs during the transmission opportunity.

Figure 12:
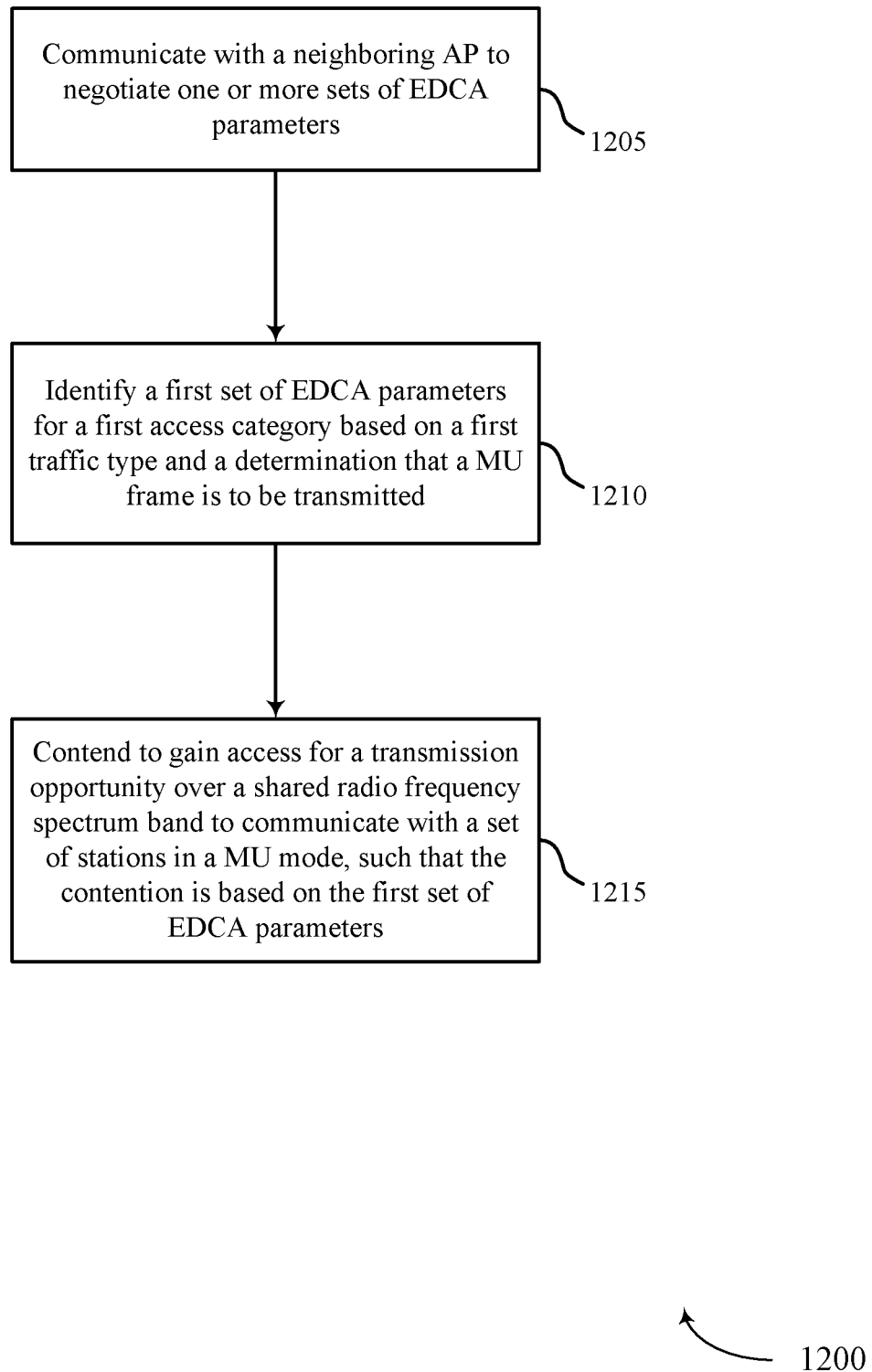
FIG. 12 shows a flowchart illustrating a method for wireless communication, in accordance with various aspects of the present disclosure.

FIG. 12 shows a flowchart illustrating a method 1200 for wireless communication, in accordance with various aspects of the present disclosure. The operations of method 1200 may be implemented by a wireless device 600, AP 105, STA 115, or components thereof, as described with reference to FIGS. 1-8. In some examples, the operations of method 1200 may be performed by the transmission opportunity manager 610 described with reference to FIGS. 6-8. In some examples, a wireless device 600 or AP 105 may execute a set of codes to control the elements of the wireless device 600 or AP 105 to perform the functions described below. Additionally or alternatively, the wireless device 600 or AP 105 may perform aspects of the functions described below using special-purpose hardware. The method 1200 may also incorporate aspects of method 900, 1000, or 1100 of FIG. 9, 10, or 11.

At block 1205, the wireless device 600 or AP 105 communicates with a neighboring AP (or a set of neighboring APs) to negotiate one or more sets of EDCA parameters for one or more access categories, as described with reference to FIG. 5. In certain examples, the operations of block 1205 may be performed by the inter-AP MU contention coordinator 865 described with reference to FIGS. 8A and 8B. At block 1210, the wireless device 600 or AP 105 identifies a first set of EDCA parameters for a first access category based at least in part on a first traffic type and a determination that a MU frame is to be transmitted, as described with reference to FIGS. 2-3. In certain examples, the operations of block 1210 may be performed by the contention parameter selector 705 described with reference to FIG. 7. At block 1215, the wireless device 600 or AP 105 contends to gain access for a transmission opportunity over a shared radio frequency spectrum band to communicate with the set of STAs in a MU mode. The contention is based at least in part on the first set of EDCA parameters, as described with reference to FIGS. 3-4. In certain examples, the operations of block 1215 may be performed by the medium access contender 710 described with reference to FIG. 7.

Thus, methods 900, 1000, 1100, and 1200 may provide for multiple user operation within a transmission opportunity of a shared radio frequency spectrum band. It should be noted that methods 900, 1000, 1100, and 1200 describe possible implementations, and that the operations and steps of the methods may be rearranged or otherwise modified such that other implementations are possible. In some examples, aspects from two or more of the methods 900, 1000, 1100, and 1200 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at an access point (AP), comprising:
    selecting, by the AP, a multiple user (MU) access category from a plurality of MU access categories, wherein the MU access category is selected based at least in part on a first traffic type associated with a frame to be transmitted and a determination that the frame to be transmitted is an MU frame;
    inputting an identifier of the MU frame to an MU queue associated with the MU access category, wherein the MU queue is mapped to MU frames associated with multiple traffic types;
    identifying, by the AP, a set of enhanced distributed channel access (EDCA) parameters for the MU access category based at least in part on selecting the MU access category;
    contending, by the AP, to gain access for a transmission opportunity over a shared radio frequency spectrum band to communicate with a plurality of stations in an MU mode, wherein the contending is based at least in part on the set of EDCA parameters; and
    transmitting, by the AP, a trigger frame to the plurality of stations upon winning contention to gain access for the transmission opportunity, wherein the trigger frame comprises an indication of an access category constraint for one or more stations of the plurality of stations to use when communicating with the AP during the transmission opportunity in response to the trigger frame.

2. The method of claim 1, wherein each trigger frame comprises an indication of the first traffic type.

3. The method of claim 1, further comprising:
    communicating with the plurality of stations in the MU mode during the transmission opportunity upon winning contention to gain access for the transmission opportunity.

4. The method of claim 1, wherein the set of EDCA parameters provides an access priority to the shared radio frequency spectrum band selected from a group consisting of:
    a same access priority as a second set of EDCA parameters for a second access category based at least in part on the first traffic type and a determination that the frame is a single user (SU) frame, a higher access priority than the second set of EDCA parameters, and a lower access priority than the second set of EDCA parameters.

5. The method of claim 1, further comprising:
    identifying the set of EDCA parameters as a set of EDCA parameters associated with the MU queue.

6. The method of claim 1, wherein the set of EDCA parameters is a linear function of a parameter from a group consisting of:
    the MU access category, and a number of the plurality of stations.

7. The method of claim 1, further comprising:
    communicating with a neighboring AP to negotiate the set of EDCA parameters.

8. The method of claim 1, wherein the MU frame is selected from a group consisting of:
    a downlink orthogonal frequency division multiple access (OFDMA) frame, an uplink OFDMA frame, a downlink MU multiple-input multiple-output (MU-MIMO) frame, and an uplink MU-MIMO frame.

9. The method of claim 1, wherein the plurality of stations is selected from a group consisting of:
    a plurality of receiving stations, and a plurality of transmitting stations.

10. An apparatus for wireless communication, comprising:
    a wireless transceiver; and
    a processor configured to execute computer readable code causing the processor to:
        select a multiple user (MU) access category from a plurality of MU access categories, wherein the MU access category is selected based at least in part on a first traffic type associated with a frame to be transmitted and a determination that the frame to be transmitted is an MU frame;

input an identifier of the MU frame to an MU queue associated with the MU access category, wherein the MU queue is mapped to MU frames associated with multiple traffic types;

identify a set of enhanced distributed channel access (EDCA) parameters for the MU access category based at least in part on selecting the MU access category;

wherein the wireless transceiver is configured to contend to gain access for a transmission opportunity over a shared radio frequency spectrum band to communicate with a plurality of stations in an MU mode, wherein the contending is based at least in part on the set of EDCA parameters; and wherein the wireless transceiver is further configured to transmit a trigger frame to the plurality of stations upon winning contention to gain access for the transmission opportunity, wherein the trigger frame comprises an indication of an access category constraint for one or more stations of the plurality of stations to use when communicating with an access point (AP) during the transmission opportunity in response to the trigger frame.

11. The apparatus of claim 10, wherein each trigger frame comprises an indication of the first traffic type.

12. The apparatus of claim 10, wherein
the wireless transceiver is further configured
to communicate with the plurality of stations in the MU mode during the transmission opportunity upon winning contention to gain access for the transmission opportunity.

13. The apparatus of claim 10, wherein the set of EDCA parameters provides an access priority to the shared radio frequency spectrum band selected from a group consisting of:

a same access priority as a second set of EDCA parameters for a second access category based at least in part on the first traffic type and a determination that the frame is a SU frame, a higher access priority than the second set of EDCA parameters, and a lower access priority than the second set of EDCA parameters.

14. The apparatus of claim 10, wherein
the set of EDCA parameters is associated with the MU queue.

15. The apparatus of claim 10, wherein the set of EDCA parameters is a linear function of a parameter from a group consisting of:

the MU access category, and a number of the plurality of stations.

16. The apparatus of claim 10, wherein
the wireless transceiver is further configured
to communicate with a neighboring AP to negotiate the set of EDCA parameters.

17. The apparatus of claim 10, wherein the MU mode is selected from a group consisting of:

a downlink OFDMA mode, an uplink OFDMA mode, a downlink MU-MIMO mode, and an uplink MU-MIMO mode.

18. The apparatus of claim 10, wherein the plurality of stations is selected from a group consisting of:

a plurality of receiving stations, and a plurality of transmitting stations.

19. An apparatus for wireless communication, comprising:

means for selecting, by an access point (AP), a multiple user (MU) access category from a plurality of MU access categories, wherein the MU access category is selected based at least in part on a first traffic type associated with a frame to be transmitted and a determination that the frame to be transmitted is an MU frame;

means for inputting an identifier of the MU frame to an MU queue associated with the MU access category, wherein the MU queue is mapped to MU frames associated with multiple traffic types;

means for identifying, by the AP, a set of enhanced distributed channel access (EDCA) parameters for the MU access category based at least in part on selecting the MU access category;

means for contending, by the AP, to gain access for a transmission opportunity over a shared radio frequency spectrum band to communicate with a plurality of stations in an MU mode, wherein the contending is based at least in part on the set of EDCA parameters; and means for transmitting, by the AP, a trigger frame to the plurality of stations upon winning contention to gain access for the transmission opportunity, wherein the trigger frame comprises an indication of an access category constraint for one or more stations of the plurality of stations to use when communicating with the AP during the transmission opportunity in response to the trigger frame.

20. The apparatus of claim 19, wherein each trigger frame comprises an indication of the first traffic type.

21. The apparatus of claim 19, further comprising:
means for communicating with the plurality of stations in the MU mode during the transmission opportunity upon winning contention to gain access for the transmission opportunity.

22. The apparatus of claim 19, wherein the set of EDCA parameters provides an access priority to the shared radio frequency spectrum band selected from a group consisting of:

a same access priority as a second set of EDCA parameters for a second access category based at least in part on the first traffic type and a determination that the frame is a SU frame, a higher access priority than the second set of EDCA parameters, and a lower access priority than the second set of EDCA parameters.

23. The apparatus of claim 19, wherein the MU mode is selected from a group consisting of:

a downlink OFDMA mode, an uplink OFDMA mode, a downlink MU multiple-input multiple-output (MU-MIMO) mode, and an uplink MU-MIMO mode.

24. A non-transitory computer-readable medium storing code for wireless communication, the code comprising instructions executable to:

select a multiple user (MU) access category from a plurality of MU access categories, wherein the MU access category is selected based at least in part on a first traffic type associated with a frame to be transmitted and a determination that the frame to be transmitted is an MU frame;

input an identifier of the MU frame to an MU queue associated with the MU access category, wherein the MU queue is mapped to MU frames associated with multiple traffic types;

identify a set of enhanced distributed channel access (EDCA) parameters for the MU access category based at least in part on selecting the MU access category;

contend to gain access for a transmission opportunity over a shared radio frequency spectrum band to communicate with a plurality of stations in an MU mode, wherein the contending is based at least in part on the set of EDCA parameters; and transmit a trigger frame to the plurality of stations upon winning contention to gain access for the transmission opportunity, wherein the trigger frame comprises an indication of an access category constraint for one or more stations of the plurality of stations to use when communicating with an access point (AP) during the transmission opportunity in response to the trigger frame.

25. The non-transitory computer-readable medium of claim 24, wherein the set of EDCA parameters provides an access priority to the shared radio frequency spectrum band from a group consisting of:

a same access priority as a second set of EDCA parameters for a second access category based at least in part on the first traffic type and a determination that the frame is a SU frame, a higher access priority than the second set of EDCA parameters, and a lower access priority than the second set of EDCA parameters.

* * * * *